US008802271B2

(12) United States Patent
Hayakawa et al.

(10) Patent No.: US 8,802,271 B2
(45) Date of Patent: Aug. 12, 2014

(54) SEPARATOR FOR NON-AQUEOUS BATTERIES, NON-AQUEOUS BATTERY USING SAME, AND PRODUCTION METHOD FOR SEPARATOR FOR NON-AQUEOUS BATTERIES

(75) Inventors: Tomohiro Hayakawa, Okayama (JP); Hideo Hayashi, Okayama (JP); Hideki Kamada, Okayama (JP); Takayoshi Hosoya, Okayama (JP); Hiroyuki Kawai, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 116 days.

(21) Appl. No.: 13/414,030

(22) Filed: Mar. 7, 2012

(65) Prior Publication Data

US 2012/0164514 A1  Jun. 28, 2012

Related U.S. Application Data

(63) Continuation of application No. PCT/JP2010/065402, filed on Sep. 8, 2010.

(30) Foreign Application Priority Data

Sep. 16, 2009 (JP) .................... 2009-214216

(51) Int. Cl.
H01M 2/16 (2006.01)
H01M 2/14 (2006.01)
H01M 10/05 (2010.01)

(52) U.S. Cl.
CPC ............. *H01M 2/162* (2013.01); *H01M 2/145* (2013.01); *H01M 2/1686* (2013.01); *Y02E 60/12* (2013.01); *H01M 10/05* (2013.01)
USPC ........................ 429/144; 429/251; 429/253

(58) Field of Classification Search
USPC ................... 429/144, 249–251, 253
See application file for complete search history.

(56) References Cited

U.S. PATENT DOCUMENTS

| 6,730,439 B2 | 5/2004 | Kamei et al. |
| 2006/0137318 A1 | 6/2006 | Lim et al. |

(Continued)

FOREIGN PATENT DOCUMENTS

| CN | 1298558 A | 6/2001 |
| EP | 2 202 764 A1 | 6/2010 |

(Continued)

OTHER PUBLICATIONS

International Preliminary Report on Patentability and Written Opinion issued Apr. 11, 2012 in PCT/JP2010/065402.

(Continued)

*Primary Examiner* — Tracy Dove
(74) *Attorney, Agent, or Firm* — Oblon, Spivak, McClelland, Maier & Neustadt, L.L.P.

(57) ABSTRACT

Provided is a separator for non-aqueous batteries not only having shutdown property but also achieving both higher output and short-circuit resistance. The separator comprising a laminate comprising: a low melting-point polymer fiber layer (A) having a melting point of 100 to 200° C., the low melting-point polymer fiber layer (A) comprising nanofibers having a fiber diameter of 1000 nm or smaller and formed from the low melting-point polymer; and a heat-resistant polymer fiber layer (B) positioned on the low melting-point polymer fiber layer (A) and comprising a high melting-point polymer having a melting point over 200° C. or a heat infusible polymer, the heat-resistant polymer fiber layer (B) comprising a mixture of nanofibers having a fiber diameter of 1000 nm or smaller and non-nanofibers having a fiber diameter over 1000 nm and both formed from heat-resistant polymer.

16 Claims, 1 Drawing Sheet

(56) References Cited

U.S. PATENT DOCUMENTS

| | | |
|---|---|---|
| 2006/0286446 A1 | 12/2006 | Chun et al. |
| 2008/0182167 A1 | 7/2008 | Kritzer |
| 2010/0195270 A1 | 8/2010 | Hayakawa et al. |
| 2010/0310921 A1 | 12/2010 | Hayakawa et al. |

FOREIGN PATENT DOCUMENTS

| | | |
|---|---|---|
| JP | 52-151624 | 12/1977 |
| JP | 61-232560 | 10/1986 |
| JP | 08-306352 | 11/1996 |
| JP | 2002-170540 | 6/2002 |
| JP | 2006-092829 | 4/2006 |
| JP | 2006-244804 A | 9/2006 |
| JP | 2010-103050 | 5/2010 |
| WO | WO 2009/050864 A1 | 4/2009 |

OTHER PUBLICATIONS

International Search Report issued Dec. 21, 2010 in PCT/JP2010/065402 filed Sep. 8, 2010.

Extended European Search Report issued Feb. 4, 2014, in Patent Application No. 10817088.7.

Combined Office Action and Search Report issued Jan. 13, 2014 in Chinese Patent Application No. 201080041219.6 (with English translation of Category of Cited Documents).

SEPARATOR FOR NON-AQUEOUS BATTERIES, NON-AQUEOUS BATTERY USING SAME, AND PRODUCTION METHOD FOR SEPARATOR FOR NON-AQUEOUS BATTERIES

CROSS REFERENCE TO THE RELATED APPLICATIONS

This application is a continuation application, under 35 U.S.C. §111(a), of international application No. PCT/JP2010/065402, filed on Sep. 8, 2010, which claims priority to Japanese Patent Application No. 2009-214216, filed on Sep. 16, 2009, the entire disclosure of which is herein incorporated by reference in their entirety into this application.

FIELD OF THE INVENTION

The present invention relates to a separator for batteries useful as construction material of non-aqueous batteries and a non-aqueous battery using the same, and further relates to a method for producing the above-mentioned separator for batteries.

BACKGROUND ART

Recently, in order to adapt to cordless electrical and electric equipments, non-aqueous batteries, such as lithium batteries (lithium primary batteries) and lithium-ion secondary batteries (lithium-ion rechargeable batteries), have attracted attention as a power source with lightweight from which high electromotive force and high energy are generated. For example, tubular-type lithium secondary batteries and others have been produced in large quantities to be used for cellular phones, laptop computers, and the like, so that the production volume has been increasing year by year. Furthermore, the non-aqueous batteries have also attracted attention as an energy source for next-generation electric motorcars. There also has been a growing desire for higher output power achieved by inhibiting electric resistance at a higher level.

There has been known, as an electrolyte for this type of non-aqueous batteries, a solution comprising an organic solvent (such as ethylene carbonate, propylene carbonate, acetonitrile, γ-butyrolactone, 1,2-dimethoxyethane and tetrahydrofuran) and an electrolyte (such as $LiPF_6$, $LiCF_3SO_3$, $LiClO$ and $LiBF_4$) dissolved in the organic solvent. However, these electrolyte solutions have a danger of ignition at a high temperature.

Furthermore, in the case where abnormal current flows in the non-aqueous batteries comprising above-mentioned materials by a short circuit or incorrect connection between positive and negative electrodes, such abnormal current may raise battery temperature to a notable degree. As a result, the high temperature of the battery may not only give a thermal damage to the instrument incorporating the battery but also may cause ignition of the electrolyte solution.

Accordingly, paying attention to a paper excellent in heat-resisting property, Patent Document 1 (JP Laid-open Patent Publication No. 8-306352) discloses a non-aqueous battery characterized in using a paper as a separator which intervenes between electrodes, the paper made by using 10% by weight or more of beaten raw material made of beatable regenerated cellulose fibers.

According to this invention, it is possible to obtain a non-aqueous battery having an increased battery capacity with high performance by using a thin separator not only excellent in heat resistance and ionic permeability but also excellent in insulation.

Moreover, Patent Document 2 (JP Laid-open Patent Publication No. 2006-92829) discloses a separator for lithium-ion secondary batteries comprising a network sheet and fiber aggregates laminated on both sides of the sheet, the fiber aggregates having a fiber diameter of 2 μm or smaller and a fiber length of 20 μm or longer.

According to this document, it is possible to obtain a separator for lithium-ion secondary batteries which is excellent in discharge rate and has overcharge resistance.

PATENT DOCUMENT

[Patent Document 1] JP Laid-open Patent Publication No. 8-306352

[Patent Document 2] JP Laid-open Patent Publication No. 2006-92829

DISCLOSURE OF THE INVENTION

Problems to be Solved by the Invention

However, the separator of Patent Document 1, although excelled in heat resistance, cannot increase its electrical resistance when abnormal current raises battery temperature. As a result, the separator cannot prevent a chemical reaction in the battery to prevent excessive temperature rise.

Moreover, the separator of Patent Document 2 allows increased contact area between fibers and an electrolyte, resulting in making it possible to minimize leakage of the electrolyte. However, the separator of Patent Document 2 still cannot prevent the reaction in the battery by increasing electric resistance thereof when the battery temperature rises.

The object of the present invention is to provide a separator for non-aqueous batteries not only achieving high output power but also excellent in shutdown property as well as short circuit resistance.

Another object of the present invention is to provide a separator for non-aqueous batteries which forms film promptly by self-melting when the temperature of the battery is unusually risen to exhibit shutdown characteristics, and further has resistance to electrolyte solution.

Still another object of the present invention is to provide a separator for non-aqueous batteries which is excellent in integrity of a nanofiber layer to the separator, and is excellent in handling ability in the production process of batteries.

Further object of the present invention is to provide a method for producing such a separator for non-aqueous batteries efficiently.

Still further object of the present invention is to provide a non-aqueous battery excellent in safety while having high output power.

Means for Solving the Problems

As a result of intensive studies conducted by the inventors of the present invention to achieve the above objects, it has been found that (i) by laminating a nanofiber layer formed of a low melting-point polymer (low melting-point polymer fiber layer) on a heat-resistant polymer fiber layer comprising a mixture of nanofibers and non-nanofibers of a heat-resistant polymer to form a separator for batteries, the low melting-point ultrafine nanofibers in the separator promptly start melting when the battery temperature rises, that (ii) the molten low melting-point nanofibers are capable of coating of the surface of the heat-resistant polymer fiber layer comprising the mixture of nanofibers and non-nanofibers to form uniform film promptly; and that (iii) even after the low melting-point polymer fiber layer became in the molten state, the heat-resistant polymer fiber layer still maintains its structure without melting to prevent short circuit of the battery and retain the safety of the battery. The present invention has now completed by the above findings.

That is, the present invention provides a separator for non-aqueous batteries comprising a laminate comprising: a low melting-point polymer fiber layer (A) comprising a low melting-point polymer having a melting point of 100 to 200° C., the low melting-point polymer fiber layer (A) comprising nanofibers having a fiber diameter of 1000 nm or smaller and formed from the low melting-point polymer; and a heat-resistant polymer fiber layer (B) positioned on the low melting-point polymer fiber layer (A) and comprising a heat-resistant polymer selected from the group consisting of a high melting-point polymer having a melting point over 200° C. and a heat infusible polymer, the heat-resistant polymer fiber layer (B) comprising a mixture of nanofibers having a fiber diameter of 1000 nm or smaller and non-nanofibers having a fiber diameter over 1000 nm and both formed from a heat-resistant polymer.

In the separator, the polymer constituting the low melting-point polymer fiber layer (A) may comprise at least one member selected from the group consisting of polyolefinic polymers, ethylene-vinyl alcohol copolymers, and fluorine-containing polymers, and/or the polymer constituting the heat-resistant polymer fiber layer (B) may comprise at least one member selected from the group consisting of fully aromatic polyamides, polyvinyl alcohol polymers, and cellulosic polymers.

In such a separator the average fiber diameter of the nanofibers included in the low melting-point polymer fiber layer (A) may be preferably within the range between 10 to 800 nm, and/or the heat-resistant polymer fiber layer (B) may be preferably a wet nonwoven fabric comprising heat-resistant polymer fibers having a CSF value of 0 to 300 mL as a matrix fiber.

Moreover, the ratio of the basis weight (Wb) of the heat-resistant polymer fiber layer (B) relative to the basis weight (Wa) of the low melting-point polymer fiber layer (A) may be (Wb)/(Wa) of about 1 to 5, and/or the basis weight (Wa) of the low melting-point polymer fiber layer (A) may be within the range between about 1 and 10 g/m$^2$, and/or the basis weight (Wb) of the heat-resistant polymer fiber layer (B) may be within the range between about 6 and 20 g/m$^2$. Further, the low melting-point polymer fiber layer (A) may be, for example, formed by electro-spinning method.

For example, in the separator of the present invention, the thickness of the laminate may be within the range between about 10 and 30 μm. Moreover, from the viewpoint of exerting shutdown property in an effective way, the separator (or the laminate) may have an initial resistance of the battery comprising the separator (or the laminate) of 0.5 to 10Ω, and the resistance of the separator after heating for 30 minutes at 10° C. higher than the melting point of the low melting-point polymer constituting the low melting-point polymer fiber layer (A) may increase more than twice of the initial resistance before heating.

The present invention also includes a method for producing the above-described separator for non-aqueous batteries comprising:

forming a heat-resistant polymer fiber layer comprising a fiber aggregate of nanofibers and non-nanofibers by preparing both the nanofibers having a diameter of 1,000 nm or smaller and the non-nanofibers having a diameter of exceeding 1,000 nm from a heat-resistant polymer comprising a high melting-point polymer having a melting point exceeding 200° C. and/or a heat-infusible polymer;

forming a low melting-point polymer fiber layer by preparing nanofibers having a fiber diameter of 1,000 nm or smaller from a low melting-point polymer having a melting point of 100 to 200° C.; and laminating the low melting-point polymer fiber layer and the heat-resistant polymer fiber layer to give a laminate.

In an embodiment utilizing electro-spinning method, the production method for producing the separator for non-aqueous batteries may comprise forming a heat-resistant polymer fiber layer comprising fiber aggregate of nanofibers and non-nanofibers by preparing both the nanofibers having a diameter of 1,000 nm or smaller and the non-nanofibers having a diameter of exceeding 1,000 nm from a heat-resistant polymer comprising a high melting-point polymer having a melting point exceeding 200° C. or a heat-infusible polymer;

preparing a spinning liquid either by solving a low melting-point polymer having a melting point of 100 to 200° C. in a solvent dissolvable of the low melting-point polymer, or melting a low melting-point polymer; and electro-spinning the spinning liquid to form nanofibers on the heat-resistant polymer fiber layer to be laminated.

In such a method, wherein the heat-resistant polymer fiber layer may comprise fibers produced by beating the heat-resistant polymer fibers as a matrix fiber.

The present invention further includes a non-aqueous battery comprising the above-mentioned separator for non-aqueous batteries.

Effect of the Invention

According to the present invention, it is possible to provide a non-aqueous battery having lower initial resistance, being capable of achieving higher output, and excelling in heat resistance while preventing short circuit generation by using a separator for non-aqueous batteries of the present invention.

Moreover, since the separator comprises a low melting-point polymer fiber layer formed of nanofibers and a heat-resistant polymer fiber layer comprising both nanofibers and non-nanofibers, even if a battery comprising the to separator is unusually heated, the low melting-point polymer can promptly melt to be a molten film to exhibit shutdown property. Accordingly, the shutdown performance of the battery can be improved.

Further, when the heat-resistant polymer fiber layer is formed of a wet nonwoven fabric, the wet nonwoven fabric comprising beaten heat-resistant polymer fibers can not only improve the strength of the separator, but also achieve good handling ability in the production process of batteries.

Furthermore, when the low melting-point polymer fiber layer is formed by the electro-spinning method, the low melting-point polymer fiber layer not only has a nanofiber structure, but is excellent in unity between the low melting-point polymer fiber layer and the heat-resistant polymer fiber layer. As a result, the improved separator for non-aqueous batteries can be efficiently manufactured.

BRIEF DESCRIPTION OF THE DRAWINGS

In any event, the present invention will become more clearly understood from the following description of preferred embodiments thereof, when taken in conjunction with the accompanying drawing. However, the embodiments and the drawing are given only for the purpose of illustration

DESCRIPTION OF THE EMBODIMENTS

The separator for non-aqueous batteries of the present invention comprises a laminate comprising a low melting-point polymer fiber layer (A) and a heat-resistant polymer fiber layer (B) formed on the layer (A). The layer (A) comprises a polymer having a melting point of 100 to 200° C. The layer (B) comprises a high melting-point polymer having a melting point exceeding 200° C. or a heat-infusible polymer.

The low melting-point polymer fiber layer (A) is formed of (comprises) nanofibers having a diameter of 1000 nm or smaller. The heat-resistant polymer fiber layer (B) is formed of (comprises) a mixture of nanofibers and non-nanofibers (i.e., a fiber aggregate containing nanofibers and non-nanofibers).

(Low Melting-Point Polymer Fiber Layer)

It is important that the low melting-point polymer fiber layer comprises a low melting-point polymer having a melting point of 100 to 200° C. Even if the temperature of a battery rises by abnormal current and/or the internal short circuit due to lithium dendrite growth, the low melting-point polymer fiber layer comprising a polymer having a melting point of 100 to 200° C. makes it possible to give shutdown property to the battery by melting to form a film and raising resistance of the battery.

The low melting-point polymer which constitutes a low melting-point polymer fiber layer is not limited to a specific one as long as the polymer can be used as a separator for non-aqueous batteries, and examples of low melting-point polymers may include polyolefinic polymers (for example, polyethylenes, polypropylenes, polybutenes, ethylene-propylene copolymers); ethylene-vinyl alcohol copolymers; fluoropolymers (for example, polyvinylidene fluorides, copolymers of fluoride vinylidene and hexafluoropropylene, copolymers of ethylene and fluoride vinylidene); vinyl polymers (for example, polystyrenes, ABS polymers, AS polymers, polyvinyl chlorides, polyvinylidene chlorides), acrylic polymers (polyacrylonitriles, poly(meta)acrylic acids, poly (meta)acrylic esters, etc.) and the like. These polymers may be used singly or in combination of two or more. It should be noted that polymers which can be used as a separator for non-aqueous batteries means that the polymers has a predetermined chemical stability to an electrolyte solution (i.e., resistance to electrolyte).

Among these polymers, from the viewpoint of film-forming property at the time of a molten state as well as chemical stability within a battery, preferable polymers may include polyolefinic polymers (for example, polyethylenes and polypropylenes), ethylene-vinyl alcohol copolymers, and fluoropolymers (for example, polyvinylidene fluorides, copolymers of fluoride vinylidene and hexafluoropropylene).

In more detail, ethylene-vinyl alcohol copolymers (EVOH) preferably comprise 25 mol % to 70 mol % of ethylene unit, and may include vinyl alcohol unit as a repeating unit singly, or vinyl alcohol unit and other vinyl monomer unit as a repeating unit in combination.

The ethylene-vinyl alcohol copolymers can be obtained by saponifying vinyl acetate parts of ethylene-vinyl acetate copolymers, and may have a saponification degree of 95 mol % or greater, preferably 98 mol % or greater, more preferably 99 mol % or greater, and 100 mol % or less.

Moreover, the number average molecular weight of the ethylene-vinyl alcohol copolymer (EVOH) may be 5,000 to about 40,000, and preferably about 8,000 to about 30,000. It should be noted that the number average molecular weight of EVOH defined here is the value measured by GPC method. Ethylene-vinyl alcohol copolymers are available from market under the trade name of "Eval" from Kuraray Co., Ltd., and under the trade name of "Soarnol" from Nippon Synthetic Chemical Industry Co., Ltd. Moreover, ethylene-vinyl acetate copolymers may be manufactured to be used by radical polymerization or the like from the ethylene and vinyl acetate both being marketed, followed by saponification.

From the viewpoint of shutdown property, the melting point of the low melting-point polymer needs to be within the range between 100 and 200° C., and may be preferably about 120 to 180° C., still more preferably about 130 to 170° C. It should be noted that the method to measure the above-mentioned melting point is described in the below-mentioned EXAMPLES.

The low melting-point polymer fiber layer (A) requires to be formed of a low melting-point polymer, and the fiber should comprise nanofiber(s) having a diameter of 1,000 nm or smaller. In addition, the low melting-point polymer fiber layer (A) may contain non-nanofiber(s) in the range which does not inhibit the shutdown effect. The low melting-point polymer fiber layer (A) may, for example, constitute 70 to 100 mass % (% by mass) of the nanofiber layer, preferably 80 to 100 mass % of the nanofiber layer, more preferably 90 to 100 mass % of the nanofiber layer, and most preferably 100 mass % of the nanofiber layer.

Nanofibers may be formed from a low melting-point polymer by known conventional methods, such as a meltblown method. Preferably a nanofiber aggregate (low melting-point polymer fiber layer) may be produced by using the electro-spinning method described later.

For example, the average fiber diameter of the fiber which constitutes a low melting-point polymer fiber layer may usually be about 10 to 1,000 nm, and preferably about 10 to 800 nm, and more preferably about 30 to 600 nm. It should be noted that the method to measure the average fiber diameter is described in the below-mentioned EXAMPLES.

(Heat-Resistant Polymer Fiber Layer)

In order to function as a support for a low melting-point polymer fiber layer at the time of film-forming of the low melting-point polymer fiber layer as well as to retain the whole configuration as a separator, the heat-resistant polymer fiber layer needs to include at least one species of polymer having heat-resisting property selected from the group consisting of (i) high melting-point polymers having a melting point exceeding 200° C. and (ii) heat-infusible polymers.

The heat-resistant polymer is not limited to a specific one as long as the polymer is applicable as a separator for non-aqueous batteries, has a predetermined heat-resisting property, and is capable of forming a nanofiber. Examples of such polymers having a melting point exceeding 200° C. (i.e., high melting-point polymer) may include fully aromatic polyamides (for example, para aramids obtained by co-condensation polymerization of p-phenylenediamine and terephthaloyl chloride, meta aramids obtained by co-condensation polymerization of m-phenylenediamine and isophthaloyl chloride, aromatic polyether amides), polyimide polymers (for example, thermoplastic polyimides, polyether imides, etc.) and polycarbonate polymers (for example, bisphenol A type polycarbonates), polyphenylene-sulfide polymers (for example, polyphenylene sulfides), polyphenylene-ether polymers (for example, polyphenylene ethers), polyether ketone polymers (polyether ketones, polyether ether ketones, etc.), polysulfone polymers (for example, polysulfones, polyether sulfones), and the like. These high melting-point polymers can be used singly or in combination of two or more.

In addition, the high melting-point polymers need to have a melting point exceeding 200° C. (for example, about 205 to 400° C.), and preferably about 220-350° C. from the viewpoint of retaining the separator form at the time of unusual heat generation of batteries. It should be noted that the method to measure the above-mentioned melting point is described in the below-mentioned EXAMPLES.

Moreover, the difference in melting point between low melting-point polymer and high melting-point polymer both of which constituting a separator may be, for example, about 50 to 200° C. and preferably about 60 to 180° C.

Moreover, examples of the heat infusible polymers may include polyvinyl alcohol polymers (for example, high strength polyvinyl alcohol fibers), cellulosic polymers [for example, purified celluloses (Tencels (trademark) etc.) and regenerated celluloses (viscose rayons, polynosic rayons, cuprammonium rayons, etc.), natural celluloses (wood pulps, hemp pulps, cotton linters, etc.), semisynthetic celluloses (cellulose esters, such as cellulose acetates, cellulose acetate butylates, and cellulose acetate propionates)], and the like. These heat infusible polymers can be used singly or in combination of two or more. It should be noted that high strength polyvinyl alcohol fibers can be produced by extruding a spinning liquid through a nozzle into a spinning bath with a low temperature to induce gelation (i.e., jelly-like solidification) followed by desolvation. The high strength polyvinyl alcohol fibers are available from Kuraray Co., Ltd. under the trade name of "Kuralon".

In addition, the heat-infusible polymer, for example, may have a heat-infusible property under a temperature exceeding 200° C. (for example, about 205 to 400° C.), and preferably about 220 to 350° C.

Among these heat-resistant polymers, from the viewpoint of being compatible in heat resistance and resistance to electrolyte, preferable polymers may include fully aromatic polyamide polymers, polyvinyl alcohol polymers, cellulosic polymers, and the like.

The heat-resistant polymer fiber layer (B) formed from the heat-resistant polymer requires to comprise a mixture of nanofibers having a diameter of 1,000 nm or smaller and non-nanofibers having a diameter exceeding 1,000 nm. Therefore, the heat-resistant polymer fiber layer (B) may be produced by once preparing nanofibers and non-nanofibers separately from a heat-resistant polymer, followed by mixing the nanofibers and the non-nanofibers together; or produced by once beating non-nanofibers of a heat-resistant polymer to be fibrillated, resulting in producing a mixture of the non-nanofibers and the fibrillated nanofibers.

For example, the blend ratio of nanofiber relative to non-nanofiber, [i.e., (nanofiber)/(non-nanofiber) mass ratio] in the mixture can be selected from the wide range between 10/90 to 90/10, and may be preferably about 20/80 to 80/20, more preferably about 30/70 to 70/30.

In the case of beaten fibers, it is preferred that the beaten fibers preferably have a beating degree defined by a CSF value of 0 to 300 mL, more preferably 0 to 200 mL, and still more preferably 0 to 100 mL. It should be noted that the method to measure the beating degree is described in the below-mentioned EXAMPLES.

Moreover, as long as heat-resistant polymer fiber layers are formable, the heat-resistant polymer fiber layers can comprise a mixture of different heat-resistant polymers constituting nanofibers and non-nanofibers separately. Preferably the heat-resistant polymer fiber layer comprises nanofibers and non-nanofibers formed of a heat-resistant polymer of the same kind.

Although the above-mentioned mixture may be a woven or knitted fabric or the like as long as shutdown characteristics can be exhibited in support of the nanofibers of the low melting-point polymer fiber layer (A), the preferable mixture may be a nonwoven fabric formed by wet paper-making method, dry paper-making methods (thermobonding, chemical-bonding, etc.), spun lace method, air-laid method, needle-punch method, or the like. In view of obtaining a thin and uniform sheet, a wet nonwoven fabric produced by the wet paper-making is most preferable.

When the heat-resistant polymer fiber layer (B) is a non-woven fabric, the nonwoven fabric may include heat-resistant polymer fibers as a matrix fiber (or base fiber) and further include a heat adhesive fiber (or binder fiber). In this case, the blend ratio of the matrix fiber relative to the heat adhesive fiber, [i.e., (matrix fiber)/(heat adhesive fiber) mass ratio] in the non-woven fabric may be about 90/10 to 50/50, and preferably about 85/15 to 55/45. Too small amount of heat adhesive fibers may reduce sheet strength of the resultant fabric insufficient to withstand production process and may not adhere to nanofiber layer sufficiently. In contrast, too much amount of heat adhesive fibers may achieve sufficient sheet strength of the fabric, but may provide the separator comprising the fabric having higher resistance because the pores of the separator may be buried by the adhesive component.

(Production Method for Separator)

Next, a method for producing the separator according to the present invention is described. The production method for a separator of the present invention can be suitably selected depending on the formation method of low melting-point nanofibers. The method at least comprises: (i) forming a heat-resistant polymer fiber layer by preparing nanofibers having a diameter of 1,000 nm or smaller and non-nanofibers having a diameter of exceeding 1,000 nm from a heat-resistant polymer comprising a high melting-point polymer having a melting point exceeding 200° C. and/or a heat-infusible polymer; (ii) forming a low melting-point polymer fiber layer by preparing nanofibers having a fiber diameter of 1,000 nm or smaller from a low melting-point polymer having a melting point of 100 to 200° C.; and (iii) laminating the low melting-point polymer fiber layer and the heat-resistant polymer fiber layer to give a laminate.

Moreover, from the viewpoint of obtaining uniform and dense nanofiber layer, the nanofiber layer may be preferably produced by electro-spinning method. In such a case, the method for producing the separator may at least comprise: forming a heat-resistant polymer fiber layer by preparing nanofibers having a diameter of 1,000 nm or smaller and non-nanofibers having a diameter of exceeding 1,000 nm from a heat-resistant polymer with a melting point exceeding 200° C. and/or a heat-infusible polymer; preparing a spinning liquid comprising either a solution of a low melting-point polymer having a melting point of 100 to 200° C. in a solvent dissolvable of the low melting-point polymer, or a molten liquid of the low melting-point polymer; and electro-spinning of the spinning liquid to form nanofibers on the heat-resistant polymer fiber layer to be overlaid and compounded.

In the electro-spinning method, first of all, a spinning liquid to form nanofibers is prepared. The spinning liquid may be a solution in which a polymer can be dissolved in a polymer-dissolvable solvent, or a molten liquid in which a polymer is molten by heating. Either of them can be used in the electro-spinning method as a spinning liquid.

When dissolving a polymer in a solvent to obtain a solution, the solution to be used as a spinning liquid does not contain granular gels to be uniformly dissolved. Depending on the polymers to be used as a solute, various solvents can be used. Examples of solvents may include water, organic solvents (alcohols such as methanol, ethanol, propanol, isopropanol, hexafluoroisopropanol, benzyl alcohol, phenol, and toluene; ketones such as acetone, 1,4-butyrolactone, cyclohexanone, 3-methyloxazolidine-2-on; ethers such as 1,4-dioxane, 1,2-dimethoxyethane, tetrahydrofuran, 2-methyltetrahydrofuran, diethyl ether, 1,3-dioxolane; aromatic hydrocarbons such as benzene; halogenated hydrocarbons such as chloroform, carbon tetrachloride, trichloroethane, and chlorination methylene; alicyclic hydrocarbons, such as cyclohexane; organic acids such as acetic acid and formic acid; amides such as N,N-dimethylformamide (DMF), N,N-dimethylacetamide, 1-methyl-2-pyrolidone (NMP), 1,3-dimethyl-2-imidazolidinone; sulfoxides such as dimethyl sulfoxide (DMSO); carbonates such as ethylene carbonate, propylene carbonate, dimethyl carbonate, diethyl carbonate, ethyl methyl carbonate, butylene carbonate; nitriles such as acetonitrile; amines such as pyridine; N-alkyl morpholineoxides such as N-methyl morpholineoxide, N-ethyl morpholineoxide, N-propyl morpholineoxide, N-isopropyl morpholineoxide, N-butyl morpholineoxide, N-isobutyl morpholineoxide, and N-t-butyl morpholineoxide; esters such as methyl formate, methyl propionate; sulfones such as sulfolane; and the like. These solvents can be used singly or in combination of two or more.

On the other hand, when a polymer is molten to obtain a spinning liquid, the spinning liquid is not limited to a specific one as long as the electro spinning method can be performed by using the molten polymer. For example, after heating a polymer to be molten with an extruder or other heating medium, the molten polymer may be used as a spinning liquid. Moreover, a linear-shaped polymer may be irradiated to be molten by a laser beam before the electro-spinning, the molten polymer can be used as a spinning liquid.

Subsequently, using the above-mentioned spinning liquid, the polymer is spun by the electro-spinning method to form an ultrafine fiber aggregate formed from fibers with nano-meter sized diameter, i.e., nanofiber layer.

The method for electro-spinning is not particularly limited to a specific one. The method comprises steps of applying a high voltage to a conductive member (nozzle) capable of extruding a spinning liquid for forming nanofibers, and depositing the nanofibers on the side of a counter conductive member being earthed. In this method, the spinning liquid is supplied from a spinning liquid supply unit, and the supplied liquid is extruded with applying high electric charge so that the liquid is electric-charged and split into droplets. Thereafter, by the action of the electrical field, continuous fibers (nanofilaments) are drawn (spun) and split from one point of the electric-charged droplets, and a number of continuous fibers (nanofilaments) are spread. Even if the polymer concentration is 10% or lower, the solvent in the solution is easily evaporated during filament formation and drawing process. The spun filaments are deposited on a collecting belt or sheet positioned at the distance from the nozzle in a range between several centimeters and several tens of centimeters. In the deposition step, the slight bonding of the deposited nanofilaments can be formed at their crossover points in a semi-dry condition. As a result, the fiber movement between the nanofilaments is avoided. Then, the nanofilaments can be deposited successively to form a dense nanofiber layer having a sheet shape.

Figure 1:
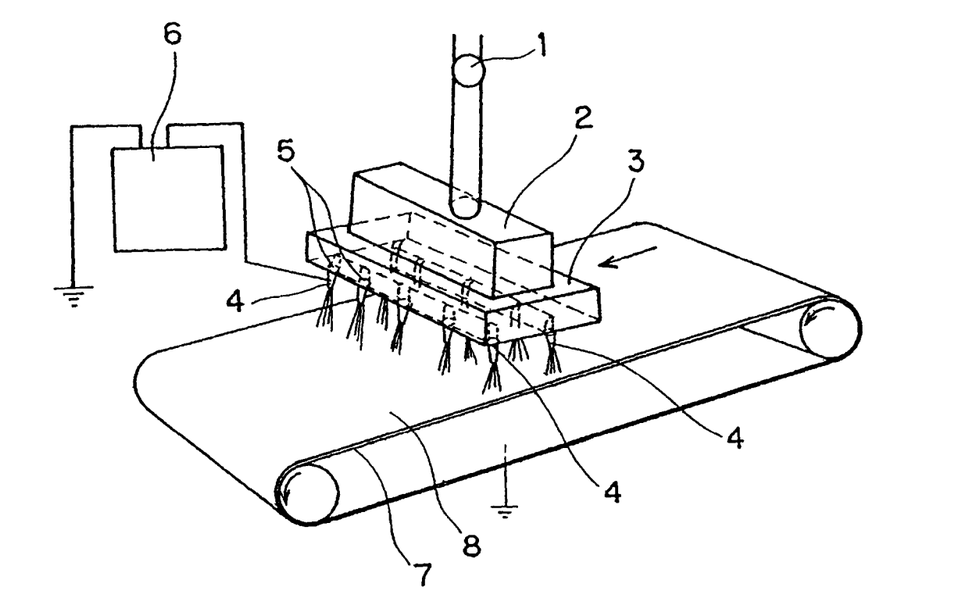
FIG. 1 is a schematic view showing one embodiment for electro-spinning machine.

Hereafter, with electro-spinning machine in the drawing the electro-spinning method for forming a low melting-point polymer fiber layer is described.

In FIG. 1 the heat-resistant polymer fiber layer (B) is placed on a take-up device 7 which takes up a formed sheet. A spinning liquid comprising a low melting-point polymer prepared in the above-described method is measured to give a predetermined amount with a metering pump 1, and the measured liquid is distributed under a uniform pressure and flow rate by a distributing and rectifying means 2 and fed into a nozzle 3.

The nozzle 3 comprises a plurality of protruding spinnerets 4, each of them having a hollow needle-like structure and being fitted to the nozzle 3. An electrical insurant member 5 can prevent the entire portion of the nozzle 3 from leaking electricity. The protruding spinnerets 4, each made of a conductive material, are attached to the nozzle 3 so as to be oriented vertically downwardly. The lines of spinnerets are positioned in parallel with each other, and each line is aligned in the direction perpendicular to the moving direction of an endless conveyor of the take-up device 7. Each of the spinnerets 4 is connected to one output terminal of a power source 6 through conducting wire to allow the power source 6 to apply a high voltage direct current (DC) to the spinnerets 4.

An earthed conductive member 8 is attached to the endless conveyor of the take-up device 7 (or a conveying device comprising an endless conveyor) to neutralize the electrical potential applied to the spinnerets 4. The spinning liquid is pressure-fed into the projecting spinnerets 4 in the nozzle 3, and then the supplied liquid is extruded with applying high electric charge so that the liquid is electric-charged and split into droplets. Thereafter, by the action of the electrical field, continuous fibers (nanofilaments) are drawn (spun) and split from one point of the electric-charged droplets, and a number of continuous fibers (nanofilaments) are spread. The spread filaments are deposited in a semi-dry condition on a heat-resistant polymer fiber layer wound or placed on the take-up device 7. The deposited nanofilaments, having slight bonding at their crossover points, are moved with the movement of the take-up device 7, and the deposition of the nanofilaments from the spinnerets 4 to the former line is successively carried out with the movement of the take-up device 7. As a result, the successive depositions of nanofilaments can form a sheet-like low-melting point polymer fiber layer having a dense and uniform structure on the heat-resistant polymer fiber layer.

If necessary, the laminate comprising the heat-resistant polymer fiber layer and the low-melting point polymer fiber layer obtained by electro-spinning method can be further subjected to heat pressing treatment such as embossing treatment or calendaring treatment to improve adhesion (or unity) of the two layers of the laminate. Further, if necessary, the thickness of the laminate may be adjusted to a desired one by cold pressing.

(Separator for Non-Aqueous Batteries)

Thus obtained laminate (or separator for batteries) may have a total basis weight of, for example, about 5 to 30 $g/m^2$, preferably about 6 to 25 $g/m^2$, and more preferably about 7 to 20 $g/m^2$.

In order to satisfy electrolyte retention and shutdown properties, the amount of a low melting-point polymer fiber layer to be laminated, i.e., the basis weight thereof (Wa) may be, for example, about 0.1 to 10 $g/m^2$, preferably about 0.2 to 7 $g/m^2$, and more preferably about 0.3 to 6 $g/m^2$.

Since the heat-resistant polymer fiber layer (B) also has a role as a support, the heat-resistant polymer fiber layer (B) needs strong physical property to withstand the practical production process of batteries. Accordingly, the heat-resistant polymer fiber layer (B) may have a basis weight (Wb) of, for example, about 6 to 20 g/m², and preferably about 8 to 18 g/m². If the basis weight is too small, the heat-resistant polymer fiber layer (B) may have difficulty to secure the strength for withstanding the production process of the batteries. In contrast, if the basis weight is too great, the heat-resistant polymer fiber layer (B) may have a thickness thicker than required as a base, resulting in increased battery resistance due to large distance between electrodes.

Further, the ratio (Wb/Wa) of the basis weight (Wb) of a heat-resistant polymer fiber layer relative to the basis weight (Wa) of a low melting-point polymer fiber layer may be about 1 to 5, and preferably about 1.5 to 4.5. It should be noted that the method to measure the basis weight is described in the below-mentioned EXAMPLES.

Moreover, the separator for batteries may have a thickness of, for example, about 8 to 40 μm, and preferably about 10 to 30 μm. It should be noted that the method to measure the thickness is described in the below-mentioned EXAMPLES.

Furthermore, the separator for batteries may have a density of about 0.3 to 0.8 g/cm³, and preferably about 0.4 to 0.75 g/cm³. Moreover, the average pore size of the whole separator for batteries may be about 0.05 to 1 μm, and preferably about 0.1 to 0.8 μm. It should be noted that the density can be obtained by dividing the basis weight by thickness, and that the method to measure the average pore size is described in the below-mentioned EXAMPLES.

Furthermore, from the viewpoint of handling ability, the separator for batteries of the present invention may have a strength of 0.3 kg/15 mm or higher (for example, about 0.3 to 3 kg/15 mm), and preferably about 0.4 to 2 kg/15 mm. It should be noted that the method to measure the strength is described in the below-mentioned EXAMPLES.

Moreover, the amount of absorbed electrolyte in the separator may be, for example, 1.5 g/g or greater (for example, about 1.5 to 6 g/g), preferably about 1.8 to 5 g/g. It should be noted that the method to measure the amount of absorbed electrolyte in the separator is described in the below-mentioned EXAMPLES.

Furthermore, the separator of the present invention comprising nanofibers in both the low melting-point polymer fiber layer and the heat-resistant polymer fiber layer can raise flowability of the electrolyte once retaining the electrolyte solution. The separator of the present invention may have an air permeability of, for example, about 1 to 600 seconds per 100 cc (s/100 cc), preferably about 30 to 500 s/100 cc. It should be noted that the method to measure the air permeability is described in the below-mentioned EXAMPLES.

Furthermore, the separator for batteries of the present invention preferably may have an improved resistance over hydrogen fluoride generated by the pyrolysis of the electrolyte solution. For example, the separator for batteries may have a weight loss percentage of preferably 2% or less, more preferably 1% or less, and especially 0% after leaving the separator in 1 mol % of lithium hexafluorophosphate liquid for 30 minutes at 100° C. It should be noted that the method to measure the weight loss percentage is described in the below-mentioned EXAMPLES.

The separator for batteries of the present invention can adapt to high power type batteries, and may have an initial resistance of, for example, about 0.5 to 10Ω preferably about 1 to 8Ω. Moreover, since the separator excels in shutdown property, the resistance of the separator after heating for 30 minutes at 10° C. higher than the melting point of the low melting-point polymer constituting the low melting-point polymer fiber layer may increase more than twice (for example, about 2 to 300 times) of the initial resistance before heating, preferably 3 to 200 times, and more preferably about 10 to 150 times of the initial resistance before heating. It should be noted that the method to measure the initial resistance and the heated resistance is described in the below-mentioned EXAMPLES.

(Non-Aqueous Battery)

The present invention also includes a non-aqueous battery comprising the above-mentioned separator. As a fundamental configuration, the non-aqueous battery comprises a positive electrode, a negative electrode, non-aqueous electrolyte solution, and a separator, and if necessary, other components which are usually equipped with in the technical field of non-aqueous electrolyte batteries. The configuration of the non-aqueous battery of the present invention is not limited to a specific one, and the non-aqueous battery of the present invention may be used as a battery having various configurations, such as a coin type, a button type, a paper type, a cylinder type, a square type, and the like.

The positive-electrode active materials of the non-aqueous battery of the present invention may be partly different between primary batteries and secondary batteries. Preferable examples of the positive-electrode active materials of the non-aqueous electrolyte primary batteries may include graphite fluoride ($CF_x$), $MnO_2$, $V_2O_5$, $SOCl_2$, $SO_2$, $FeS_2$, CuO, CuS and the like. These positive-electrode active materials may be used singly or in combination of two or more. Among them graphite fluoride ($CF_x$) and $MnO_2$ are preferably used because they are capable of achieving high energy density as well as excelling in safety.

Moreover, preferable examples of the positive-electrode active materials of the non-aqueous electrolyte secondary batteries may include metal oxides such as $V_2O_5$ and $Nb_2O_5$, lithium-containing composite oxides such as $Li_{(1-x)}NiO_2$, $Li_{(1-x)}MnO_2$, $Li_{(1-x)}Mn_2O_4$, $Li_{(1-x)}CoO_2$, $Li_{(1-x)}FeO_2$, transition metal polyanion compounds such as lithium transition metal polyanion ($LiFePO_4$), conductive polymers, and the like. It should be noted that X in the exemplified compounds represents the number of 0 to 1. These positive-electrode active materials can be used singly or in combination of two or more. Among them preferred one includes $Li_{(1-x)}CoO_2$, $Li_{(1-x)}NiO_2$, and $Li_{(1-x)}MnO_2$ (especially $LiCoO_2$, $LiNiO_2$, and $LiMn_2O_4$) of layer structure or spinel structure since they can achieve high energy density and excels in safety.

The negative-electrode active materials of the non-aqueous battery of the present invention may be partly different between primary batteries and secondary batteries. Examples of the negative-electrode active materials of the non-aqueous electrolyte primary batteries may include lithium metal and lithium alloys such as Mg—Li alloys, and Al—Li alloys, and the like. These negative-electrode active materials can be used singly or in combination of two or more.

Moreover, examples of the negative-electrode active materials of the non-aqueous electrolyte secondary batteries may include lithium metal, carbon materials such as graphite or amorphous carbon, and the like. Among them, especially preferred one includes carbon materials. The carbon materials have a comparatively larger specific surface area, and achieve quick adsorption and discharge of lithium. Therefore, the carbon materials make it possible to give good charge-and-discharge characteristics in large current, as well as higher output and/or regeneration densities. In particular, taking into consideration of the balance between output and regeneration densities, it is desirable to use carbon materials having a comparatively large voltage change during charge and discharge. Further, by using such carbon materials as a negative-electrode active material, higher charge-and-discharge efficiency and good cycle characteristic are achieved.

In addition, when a carbon material is used as a negative-electrode active material, if needed, it is desirable to mix a conductive material and a binder with a negative-electrode active material to obtain a negative-electrode composite material to be used for coating a collector.

EXAMPLES

Hereinafter, the present invention will be demonstrated by way of some examples that are presented only for the sake of illustration, which are not to be construed as limiting the scope of the present invention. It should be noted that the physical properties were evaluated in the following manners in the following Examples. It should be noted that part(s) and percentage(s) in Examples relate to mass unless otherwise mentioned.

[Average Fiber Diameter (nm)]

In a low melting-point polymer fiber layer, 100 fibers were chosen at random from constituent fibers in a photograph of the enlarged cross section of the nonwoven fabric at a magnifying power of 5,000 with the use of an electron microscope, to measure those diameters of fibers. Then the average value of the diameters measured was taken as the average fiber diameter.

[Maximum Fiber Diameter and Minimum Fiber Diameter]

In a heat-resistant polymer fiber layer, 100 fibers were chosen at random from constituent fibers in a photograph of the enlarged cross section of the nonwoven fabric at a magnifying power of 5,000 with the use of an electron microscope, to measure those diameters of fibers. Then the largest and smallest values were treated as the maximum fiber diameter and the minimum fiber diameter, respectively.

[Melting Point of Polymer (° C.)]

A sample (50 mg) was measured by using a differential scanning calorimeter (produced by and available from Seiko Instruments Inc.: DSC6200) to determine an endothermic-peak value of the sample as the melting point.

[Basis Weight (g/m$^2$)]

In accordance with "Determination method for basis weight (grammage) per meter of paper" of Japanese Industrial Standards P 8124, the basis weight was determined.

[Thickness (mm)]

In accordance with "Determination of thickness and apparent bulk density of paper and board" of Japanese Industrial Standards P 8118, the thickness was determined.

[Strength (kg/15 mm)]

In accordance with "Paper and board—Determination of tensile properties" of Japanese Industrial Standards P 8113, the strength was determined.

[Liquid Absorption Amount (g/g)]

A sample of 50 mm by 50 mm was immersed in 1 mol % of lithium-hexafluorophosphate liquid (Kishida Chemical Co., Ltd.; 1 mol/L LiPF$_6$/EC:EMC=3:7 (v/v %); 23° C.) at a bath ratio of 1:100 for 30 minutes, then the immersed sample was drained without suction for 30 seconds. Thereafter the mass weight of the drained sample was measured to determine a liquid absorption amount by dividing the drained sample mass by the initial sample mass.

[Air Permeability (s/100 cc)]

In accordance with Japanese Industrial Standards P 8117 the air permeability was determined with Gurley densometer.

[Average Pore Size (μm)]

The average pore size was determined by using "Perm-Porometer" manufactured by and available from Porous Materials, Inc.

[Electrolyte Resistance (%)]

A sample of 5 cm by 5 cm was preliminary weighed and immersed in 1 mol % of lithium-hexafluorophosphate liquid (Kishida Chemical Co., Ltd.; 1 mol/L LiPF$_6$/EC:EMC=3:7 (v/v %)) at 100° C. for 30 minutes, then the immersed sample was removed and washed with water. The washed sample was dried, then the mass weight of the dried sample was measured to determine weight loss (%) of the sample before and after the treatment.

[Initial Resistance (Ω)]

A sample was immersed in 1 mol % of lithium-hexafluorophosphate liquid (Kishida Chemical Co., Ltd.; 1 mol/L LiPF$_6$/EC:EMC=3:7 (v/v %)) at 20° C. for 30 minutes, then the immersed sample was drained without suction for 30 seconds so that the sample still contained sufficient liquid in their pores. Thereafter, resistance (impedance) of the drained sample was measured with impedance measuring equipment ("KC-547 LCR METER" manufactured by KOKUYO ELECTRIC CO., LTD) under a measuring atmosphere of 20° C.×65% RH.

When the measured resistance was 10Ω or lower, the sample was determined as "good" because of low resistance sufficient to produce high output non-aqueous batteries. In contrast, the sample having a measured resistance of higher than 10Ω was determined as "poor" because of high resistance to produce deteriorated non-aqueous batteries.

[Resistance after Heating (Ω)]

Into an airtight container made of stainless steel an electrolyte solution and a sample were supplied to heat them in an oil bath for 30 minutes at a temperature of 10° C. higher than the melting point of the low melting point polymer which constitutes the low melting point polymer fiber layer of the sample. The heated sample was immersed in 1 mol % of lithium-hexafluorophosphate liquid (Kishida Chemical Co., Ltd.; 1 mol/L LiPF$_6$/EC:EMC=3:7 (v/v %)) at 20° C. for 30 minutes, then the immersed sample was drained without suction for 30 seconds so that the sample still contained sufficient liquid in their pores. Thereafter, resistance (impedance) of the drained sample was measured with impedance measuring equipment ("KC-547 LCR METER" manufactured by KOKUYO ELECTRIC CO., LTD) under a measuring atmosphere of 20° C.×65% RH.

When the measured resistance was increased more than twice of the initial resistance, the sample was determined as "good" because of exertion of shutdown property. In contrast, the sample having a measured resistance of lower than the above was determined as "poor".

Example 1

(1) Production of Heat Resistant Polymer Fiber Layer (B)

Organic solvent-spun rayon fibers ("Tencel" (trademark) manufactured by Courtaulds; 1.7 dtex×3 mm) were beaten with a pulper and a fiberizer to be a fibrillated material having a CSF value of 0 mL. A slurry was prepared by using the above fibrillated material as a matrix fiber and ethylene-vinyl alcohol fibers ("S030" manufactured by Kuraray Co., Ltd.) as a binder fiber at a mass ratio of (matrix fiber):(binder fiber)=80:20.

Paper making of this slurry was carried out with a cylinder paper machine, then the resultant was dried with a dryer at a temperature of 130° C. to produce a heat-resistant polymer fiber layer with a basis weight of 10.9 g/m$^2$ and a thickness of 15 μm.

(2) Production of Low Melting-Point Polymer Fiber Layer (A)

Ethylene-vinyl alcohol copolymer (EVOH: "EVAL-G" manufactured by Kuraray Co., Ltd.) was added into DMSO solvent to dissolve in a still-standing state at a temperature of 25° C. to prepare a spinning liquid in the concentration of 14% by mass. By using the spinning liquid, electro-spinning was carried out with a spinning machine of FIG. 1 type.

The spinning machine comprises a needle having an inside diameter of 0.9 mm as the spinneret 4. The distance between the spinnerets 4 and the take-up device 7 was set to be 8 cm. The heat resistant polymer fiber layer obtained in the procedure of (1) was placed and wound up into the take-up device 7. Then, while moving the take-up device 7 at a conveyer speed of 0.1 m per minute, the spinning solution was extruded from the spinnerets 4 in a predetermined supply amount with applying the voltage of 20 kV to the spinnerets 4 to laminate (deposit) nanofibers having a fiber diameter of 200 nm and a basis weight of 3.2 g/m$^2$ on the heat resistant polymer fiber layer.

Thus obtained laminate product (multilayer sheet) was subjected to heat pressing treatment at a temperature to improve the bonding between the heat-resistant polymer fiber layer and low melting-point polymer fiber layer to obtain a separator. The properties of thus obtained separator are shown in Table 1.

Example 2

Except for using polypropylene as a low melting-point polymer fiber layer instead of the ethylene-vinyl alcohol copolymer of Example 1, a separator was produced in the same way with Example 1.

More specifically, the polypropylene ("B101" manufactured by Grand Polymer Co., Ltd.) was melt-kneaded at 300° C. with a twin-screw extruder to obtain a spinning liquid, then electro-spinning was carried out with the spinning machine of FIG. 1 type to produce low melting-point nanofibers.

The spinning machine comprises a needle having an inside diameter of 0.3 mm as the spinneret 4. The distance between the spinnerets 4 and the take-up device 7 was set to be 6 cm. The heat resistant polymer fiber layer obtained in the procedure of (1) of Example 1 was placed and wound up into the take-up device 7. Then, while moving the take-up device 7 at a conveyer speed of 0.1 m per minute, the spinning solution was extruded from the spinnerets 4 in a predetermined supply amount with applying the voltage of 40 kV to the spinnerets 4 to laminate (deposit) nanofiber layer having a fiber diameter of 450 nm and a basis weight of 3.4 g/m$^2$ on the heat-resistant polymer fiber layer. The properties of thus obtained separator are shown in Table 1.

Example 3

Except for using polyethylene ("5202B" manufactured by Mitsui Chemicals Inc.) instead of the low melting-point polymer of Example 2, a separator was produced in the same way with Example 2. The properties of thus obtained separator are shown in Table 1.

Example 4

Except for using polyvinylidene fluoride ("KYNAK FLEX" manufactured by Arkema Inc.) instead of the low melting-point polymer of Example 2, a separator was produced in the same way with Example 2. The properties of thus obtained separator are shown in Table 1.

Example 5

Except for using copolymer of vinylidene fluoride and hexafluoropropylene ("KYNAK FLEX" manufactured by Arkema Inc.) instead of the low melting-point polymer of Example 2, a separator was produced in the same way with Example 2. The properties of thus obtained separator are shown in Table 1.

Example 6

Except for using a blend of polyvinylidene fluoride (PVDF: "KYNAK" manufactured by Arkema Inc.) and ethylene-vinyl alcohol copolymer (EVOH: "EVAL-G" manufactured by Kuraray Co., Ltd.) (mass ratio: PVDF/EVOH=30/70) instead of the low melting-point polymer of Example 2, a separator was produced in the same way with Example 2. The properties of thus obtained separator are shown in Table 1.

Example 7

Except for using aramid resin ("Kevlar" manufactured by Du Pont-Toray Co., Ltd., 1.7 dtex, 3 mm in length) as polymer for the matrix fiber constituting the heat-resistant polymer fiber layer of Example 1, a separator was produced in the same way with Example 1. More specifically, the aramid fibers were beaten with a pulper and a fiberizer to be a fibrillated material having a CSF value of 100 mL.

Example 8

Except for using a mixture of polyvinyl alcohol fiber ("VPB 033x3" manufactured by Kuraray Co., Ltd.) and the fibrillated material of organic solvent-spun rayon fibers ("Tencel" (trademark) manufactured by Courtaulds) obtained in Example 1 as a matrix fiber in the heat-resistant polymer fiber layer, a separator was produced in the same way with Example 1.

Comparative Example 1

Except for using un-beaten organic solvent-spun rayon fibers ("Tencel" (trademark) manufactured by Courtaulds) as a matrix fiber in the heat-resistant polymer fiber layer, a separator was produced in the same way with Example 1. The properties of thus obtained separator are shown in Table 2.

Comparative Example 2

Except for omitting the heat-resistant polymer fiber layer, a separator was produced in the same way with Example 1. The properties of thus obtained separator are shown in Table 2.

Comparative Example 3

Except for omitting the low melting-point polymer fiber layer, a separator was produced in the same way with Example 1. The properties of thus obtained separator are shown in Table 2.

Comparative Example 4

Except for forming non-nanofibers having a fiber diameter of 1,200 nm by electro-spinning as a low melting-point polymer fiber layer, a separator was produced in the same way with Example L The properties of thus obtained separator are shown in Table 2.

Comparative Example 5

Into twin screw extruder 100 parts by mass of polyethylene ("5202B" manufactured by Mitsui Chemicals Inc.) were supplied and fully melt-kneaded at 220° C. with pouring 120 parts by mass of liquid paraffin from the inlet provided with the extruder to prepare a polyethylene solution. Thus obtained polyethylene solution was extruded from the T-die attached at the tip of the twin screw extruder in the shape of a sheet, then the resultant sheet was cooled. This sheet was set to a biaxially-stretching machine to subject simultaneous biaxial stretching at a drawing ratio of 7×7 times at 115° C. Thereafter the liquid paraffin was extracted by methyl ethyl ketone to obtain polyethylene microporous film. The properties of thus obtained microporous film are shown in Table 2.

Comparative Example 6

The aramid hybrid prepared by the method of Japanese Patent Publication No. 52-151624 was subjected to a disintegration and beating machine to obtain an aramid hybrid pulp-like material having a weight average fiber length of 0.9 mm. A slurry was prepared by dispersing 5 parts by weight of the aramid hybrid pulp-like material and 49 parts by weight of aramid short cut fiber (meta-aramid fiber manufactured by E. I. du Pont de Nemours& Co., fiber length of 6 mm) into water. Thus obtained slurry was subjected to TAPPI sheet machine (cross-sectional area: 325 cm$^2$) to produce a sheet-like material. Thereafter, the sheet-like material was heat-pressed with metal calender rolls at a temperature of 295° C. and a linear pressure of 300 kg/cm to obtain an aramid thin paper material.

The microporous film made from polyethylene produced in Comparative Example 5 was adhered to the aramid thin paper material to produce a separator. The properties of thus obtained separator are shown in Table 2.

TABLE 1

|  | Ex. 1 | Ex. 2 | Ex. 3 | Ex. 4 |
|---|---|---|---|---|
| Low melting-polymer layer | | | | |
| Production process | ES* | ES | ES | ES |
| Polymer | EVOH | PP | PE | PVDF |
| Melting point (° C.) | 158 | 160 | 135 | 165 |
| Fiber diameter (nm) | 200 | 450 | 470 | 300 |
| Basis weight (g/m$^2$) | 3.2 | 3.4 | 3.5 | 3.2 |
| Heat-resistant polymer layer | | | | |
| Production process | WP* | WP | WP | WP |
| Matrix fiber Polymer | Cellulose | Cellulose | Cellulose | Cellulose |
| Melting point (° C.) | — | — | — | — |
| Fiber diameter (nm) | 30-12000 | 30-12000 | 30-12000 | 30-12000 |
| Other component fiber etc. | | | | |
| Binder fiber | EVOH | EVOH | EVOH | EVOH |
| Electrolyte swellable resin | — | — | — | — |
| Basis weight (g/m$^2$) | 10.3 | 10.3 | 10.3 | 10.3 |
| Air permeability (s/100 cc) | 7 | 7 | 7 | 7 |
| Laminate | | | | |
| Basis weight (g/m$^2$) | 13.5 | 13.7 | 13.8 | 13.5 |
| Thickness (μm) | 22 | 23 | 23 | 23 |
| Density (g/cm$^3$) | 0.61 | 0.60 | 0.60 | 0.59 |
| Strength (kg/15 mm) | 0.6 | 0.6 | 0.6 | 0.6 |
| Liquid absorption amount (g/g) | 2.0 | 2.1 | 2.2 | 1.9 |
| Air permeability (s/100 cc) | 151 | 163 | 181 | 153 |
| Average pore size (μm) | 0.25 | 0.22 | 0.21 | 0.25 |
| Electrolyte resistance (weight loss %) | 0 | 0 | 0 | 0 |
| Initial resistance (Ω) | 4 | 5 | 5 | 4 |
| High power output | Good | Good | Good | Good |
| Resistance after heating (Ω) | 103 | 87 | 79 | 91 |
| Shutdown property | Good | Good | Good | Good |
| Comprehensive judgment | Good | Good | Good | Good |

|  | Ex. 5 | Ex. 6 | Ex. 7 | Ex. 8 |
|---|---|---|---|---|
| Low melting-polymer layer | | | | |
| Production process | ES* | ES | ES | ES |
| Polymer | PVDF-HFP | PVDF/EVOH | EVOH | EVOH |
| Melting point (° C.) | 116 | 165/158 | 158 | 158 |
| Fiber diameter (nm) | 340 | 300/200 | 200 | 200 |
| Basis weight (g/m$^2$) | 3.2 | 4.0 | 3.2 | 3.2 |
| Heat-resistant polymer layer | | | | |
| Production process | WP* | WP | WP | WP |
| Matrix fiber polymer | Cellulose | Cellulose | Aramid | PVA/Cellulose |
| Melting point (° C.) | — | — | Unclear | — |
| Fiber diameter (nm) | 30-12000 | 30-12000 | 30-12400 | 30-12000 |
| Other component fiber etc. | | | | |
| Binder fiber | EVOH | EVOH | PVA | EVOH |
| Electrolyte swellable resin | — | — | — | — |
| Basis weight (g/m$^2$) | 10.3 | 10.3 | 10.1 | 10.3 |
| Air permeability (s/100 cc) | 7 | 6 | 5 | 7 |
| Laminate | | | | |
| Basis weight (g/m$^2$) | 13.5 | 14.3 | 13.3 | 13.5 |
| Thickness (μm) | 23 | 22 | 21 | 22 |
| Density (g/cm$^3$) | 0.59 | 0.65 | 0.63 | 0.61 |
| Strength (kg/15 mm) | 0.6 | 0.8 | 0.5 | 0.6 |
| Liquid absorption amount (g/g) | 1.9 | 2.2 | 2.3 | 2.0 |
| Air permeability (s/100 cc) | 155 | 201 | 172 | 151 |
| Average pore size (μm) | 0.25 | 0.21 | 0.21 | 0.25 |
| Electrolyte resistance (weight loss %) | 0 | 0 | 0 | 0 |
| Initial resistance (Ω) | 4 | 5 | 5 | 4 |
| High power output | Good | Good | Good | Good |
| Resistance after heating (Ω) | 75 | 108 | 82 | 103 |
| Shutdown property | Good | Good | Good | Good |
| Comprehensive judgment | Good | Good | Good | Good |

*ES and WP denote electro-spinning and wet paper-making, respectively.

TABLE 2

|  | Com. Ex. 1 | Com. Ex. 2 | Com. Ex. 3 |
|---|---|---|---|
| Low melting-polymer layer | | | |
| Production process | ES* | ES | — |
| Polymer | EVOH | EVOH | — |
| Melting point (° C.) | 158 | 158 | — |

TABLE 2-continued

| | | | |
|---|---|---|---|
| Fiber diameter (nm) | 200 | 200 | — |
| Basis weight (g/m²) | 3.2 | 3.2 | — |
| Heat-resistant polymer layer | | | |
| Production process | WP* | — | WP |
| Matrix fiber polymer | Cellulose | — | Cellulose |
| Melting point (° C.) | — | — | — |
| Fiber diameter (nm) | 12000 | — | 30-12000 |
| Binder fiber | EVOH | — | EVOH |
| Basis weight (g/m²) | 10.9 | — | 10.3 |
| Air permeability (s/100 cc) | 1> | — | 7 |
| Laminate | | | |
| Basis weight (g/m²) | 14.1 | 3.2 | 10.3 |
| Thickness (μm) | 27 | 6 | 15 |
| Density (g/cm³) | 0.52 | 0.53 | 0.69 |
| Strength (kg/15 mm) | 0.7 | 0.1 | 0.5 |
| Liquid absorption amount (g/g) | 2.9 | — | 3.3 |
| Air permeability (s/100 cc) | 43 | — | 7 |
| Average pore size (μm) | 0.51 | — | 1.7 |
| Electrolyte resistance (weight loss %) | 0 | 0 | 0 |
| Initial resistance (Ω) | 4 | — | Short circuit |
| High power output | Good | — | Poor |
| Resistance after heating (Ω) | 7 | — | — |
| Shutdown property | Poor | — | — |
| Comprehensive judgment | Poor | Handling impossible | Poor |

| | Com. Ex. 4 | Com. Ex. 5 | Com. Ex. 6 |
|---|---|---|---|
| Low melting-polymer layer | | | |
| Production process | ES* | — | — |
| Polymer | EVOH | PE porous film | PE porous film |
| Melting point (° C.) | 158 | 135 | 135 |
| Fiber diameter (nm) | 1200 | — | — |
| Basis weight (g/m²) | 3.2 | 16.5 | 16.5 |
| Heat-resistant polymer layer | | | |
| Production process | WP* | — | WP |
| Matrix fiber polymer | Cellulose | — | Aramid |
| Melting point (° C.) | — | — | Unclear |
| Fiber diameter (nm) | 30-12000 | — | 30-12400 |
| Binder fiber | EVOH | — | Aramid short cut |
| Basis weight (g/m²) | 10.3 | — | 9.9 |
| Air permeability (s/100 cc) | 7 | — | 5 |
| Laminate | | | |
| Basis weight (g/m²) | 13.5 | 16.5 | 18.5 |
| Thickness (μm) | 26 | 20 | 25 |
| Density (g/cm³) | 0.52 | 0.83 | 0.74 |
| Strength (kg/15 mm) | 0.6 | 3.9 | 2.8 |
| Liquid absorption amount (g/g) | 2.6 | 2.0 | 2.1 |
| Air permeability (s/100 cc) | 16 | 380 | 400 |
| Average pore size (μm) | 0.71 | 0.19 | 0.19 |
| Electrolyte resistance (weight loss %) | 0 | 0 | 0 |
| Initial resistance (Ω) | Short circuit | 11 | 15 |
| High power output | Poor | Poor | Poor |
| Resistance after heating (Ω) | — | 80 | 95 |
| Shutdown property | — | Good | Good |
| Comprehensive judgment | Poor | Poor | Poor |

*ES and WP denote electro-spinning and wet paper-making, respectively.

Since each of Examples 1 to 8 has a low initial resistance, these separators show sufficient characteristics as a separator for non-aqueous batteries with high output power. Further, since these Examples are capable of forming film by the molten polymer of their low melting-point polymer fiber layer when unusual heat generates, they also show good shutdown characteristics. Furthermore, these separators also excel in handling ability at the time of manufacture because of their high strength. Furthermore, the weight of separators did not change at all after exposure of hydrogen fluoride (HF) generated by decomposition of the electrolyte solution. Accordingly the separators also have enhanced resistance to hydrogen fluoride.

On the other hand, since the separator of Comparative Example 1 does not have nanofibers in the heat-resistant polymer fiber layer, the molten polymer of the low melting-point polymer fiber layer flows into pores of the heat-resistant polymer fiber layer (B) at the time of unusual heat generation, resulting in failing to form film efficiently for achieving sufficient shutdown property. Accordingly, the separator of Comparative Example 1 cannot be used as a separator for non-aqueous batteries which inevitably require safety.

The separator of Comparative Example 2 has lower strength and is easy to be damaged. Accordingly, the separator deteriorating in workability cannot be used as a separator for non-aqueous batteries.

Moreover, both the separator of Comparative Example 3 which does not contain a low melting-point polymer fiber layer and the separator of Comparative Example 4 in which the low melting-point polymer fiber layer does not contain nanofibers are internally shorted.

Since the microporous film of Comparative Example 5 has high initial resistance, when it is used as a separator for non-aqueous batteries, the internal resistance of the battery becomes too high to obtain high output power. Further the film certainly has shutdown characteristics by the molten polymer, but it cannot keep the sheet structure when the temperature of the sheet becomes higher than that to exert shutdown characteristics because of unusual heat generation, resulting in contact of electrode materials to increase danger of the battery. Accordingly, the shutdown property of the film is inadequate as a safeguard.

Since the microporous film of Comparative Example 6 also has high initial resistance when it is used as a separator for non-aqueous batteries, the internal resistance of the battery becomes too high to obtain high output power.

INDUSTRIAL APPLICABILITY

The separator for non-aqueous batteries of the present invention can be used for non-aqueous batteries.

As mentioned above, the preferred embodiments of the present invention are illustrated with referring to FIGURE, but it is to be understood that other embodiments may be included, and that various changes or modifications may be made, without departing from the spirit or scope of the present invention.

What is claimed is:

1. A separator for non-aqueous batteries comprising a laminate, comprising:
   a low melting-point polymer fiber layer (A) comprising a low melting-point polymer having a melting point of 100 to 200° C., the low melting-point polymer fiber layer (A) comprising nanofibers having a fiber diameter of 1000 nm or smaller and formed from the low melting-point polymer; and
   a heat-resistant polymer fiber layer (B) positioned on the low melting-point polymer fiber layer (A) and comprising a heat-resistant polymer selected from the group consisting of a high melting-point polymer having a melting point over 200° C. and a heat infusible polymer, the heat-resistant polymer fiber layer (B) comprising a mixture of nanofibers having a fiber diameter of 1000 nm or smaller and non-nanofibers having a fiber diameter over 1000 nm and both formed from the heat-resistant polymer.

2. The separator for non-aqueous batteries as claimed in claim 1, wherein the polymer constituting the low melting-point polymer fiber layer (A) comprises at least one member selected from the group consisting of polyolefinic polymers, ethylene-vinyl alcohol copolymers, and fluorine-containing polymers.

3. The separator for non-aqueous batteries as claimed in claim 1, wherein the polymer constituting the heat-resistant polymer fiber layer (B) comprises at least one member selected from the group consisting of fully aromatic polyamides, polyvinyl alcohol polymers, and cellulosic polymers.

4. The separator for non-aqueous batteries as claimed in claim 1, wherein an average fiber diameter of the nanofibers included in the low melting-point polymer fiber layer (A) is within a range between 10 to 800 nm.

5. The separator for non-aqueous batteries as claimed in claim 1, wherein the heat-resistant polymer fiber layer (B) is a wet nonwoven fabric comprising heat-resistant polymer fibers having a CSF value of 0 to 300 mL as a matrix fiber.

6. The separator for non-aqueous batteries as claimed in claim 1, wherein a ratio of a basis weight (Wb) of the heat-resistant polymer fiber layer (B) relative to a basis weight (Wa) of the low melting-point polymer fiber layer (A) is (Wb)/(Wa) of 1 to 5.

7. The separator for non-aqueous batteries as claimed in claim 1, wherein a basis weight (Wa) of the low melting-point polymer fiber layer (A) is within a range between 1 and 10 g/m$^2$, and a basis weight (Wb) of the heat-resistant polymer fiber layer (B) is within a range between 6 and 20 g/m$^2$.

8. The separator for non-aqueous batteries as claimed in claim 1, wherein a thickness of the laminate is within a range between 10 and 30 μm.

9. The separator for non-aqueous batteries as claimed in claim 1, wherein an initial resistance of the separator is from 0.5 to 10Ω, and a resistance of the separator after heating for 30 minutes at 10° C. higher than a melting point of the low melting-point polymer constituting the low melting-point polymer fiber layer (A) increases more than twice of the initial resistance before heating.

10. The separator for non-aqueous batteries as claimed in claim 1, wherein the separator has an air permeability of 1 to 600 seconds per 100 cc.

11. A method for producing a separator for non-aqueous batteries, comprising either:
(i) forming a heat-resistant polymer fiber layer comprising a fiber aggregate of nanofibers and non-nanofibers by preparing both the nanofibers having a diameter of 1,000 nm or smaller and the non-nanofibers having a diameter of exceeding 1,000 nm from a heat-resistant polymer comprising a high melting-point polymer having a melting point exceeding 200° C., a heat-infusible polymer or both,
forming a low melting-point polymer fiber layer by preparing nanofibers having a fiber diameter of 1,000 nm or smaller from a low melting-point polymer having a melting point of 100 to 200° C., and
laminating the low melting-point polymer fiber layer and the heat-resistant polymer fiber layer to give a laminate; or
(ii) forming a heat-resistant polymer fiber layer comprising fiber aggregate of nanofibers and non-nanofibers by preparing both the nanofibers having a diameter of 1,000 nm or smaller and the non-nanofibers having a diameter of exceeding 1,000 nm from a heat-resistant polymer comprising a high melting-point polymer having a melting point exceeding 200° C., a heat-infusible polymer, or both,
preparing a spinning liquid either by solving a low melting-point polymer having a melting point of 100 to 200° C. in a solvent dissolvable of the low melting-point polymer, or by melting a low melting-point polymer, and
electro-spinning the spinning liquid to form nanofibers on the heat-resistant polymer fiber layer to be laminated, wherein
the separator comprises:
a low melting-point polymer fiber layer (A) comprising a low melting-point polymer having a melting point of 100 to 200° C., the low melting-point polymer fiber layer (A) comprising nanofibers having a fiber diameter of 1000 nm or smaller and formed from the low melting-point polymer; and
a heat-resistant polymer fiber layer (B) positioned on the low melting-point polymer fiber layer (A) and comprising a heat-resistant polymer selected from the group consisting of a high melting-point polymer having a melting point over 200° C. and a heat infusible polymer, the heat-resistant polymer fiber layer (B) comprising a mixture of nanofibers having a fiber diameter of 1000 nm or smaller and non-nanofibers having a fiber diameter over 1000 nm and both formed from the heat-resistant polymer.

12. The method as claimed in claim 11, comprising:
forming a heat-resistant polymer fiber layer comprising a fiber aggregate of nanofibers and non-nanofibers by preparing both the nanofibers having a diameter of 1,000 nm or smaller and the non-nanofibers having a diameter of exceeding 1,000 nm from a heat-resistant polymer comprising a high melting-point polymer having a melting point exceeding 200° C., a heat-infusible polymer or both;
forming a low melting-point polymer fiber layer by preparing nanofibers having a fiber diameter of 1,000 nm or smaller from a low melting-point polymer having a melting point of 100 to 200° C.; and
laminating the low melting-point polymer fiber layer and the heat-resistant polymer fiber layer to give a laminate.

13. The method as claimed in claim 11, comprising:
forming a heat-resistant polymer fiber layer comprising fiber aggregate of nanofibers and non-nanofibers by preparing both the nanofibers having a diameter of 1,000 nm or smaller and the non-nanofibers having a diameter of exceeding 1,000 nm from a heat-resistant polymer comprising a high melting-point polymer having a melting point exceeding 200° C., a heat-infusible polymer, or both;
preparing a spinning liquid either by solving a low melting-point polymer having a melting point of 100 to 200° C. in a solvent dissolvable of the low melting-point polymer, or by melting a low melting-point polymer; and
electro-spinning the spinning liquid to form nanofibers on the heat-resistant polymer fiber layer to be laminated.

14. The method as claimed in claim 12, wherein the heat-resistant polymer fiber layer comprises fibers produced by beating the heat-resistant polymer fibers as a matrix fiber.

15. The method as claimed in claim 13, wherein the heat-resistant polymer fiber layer comprises fibers produced by beating the heat-resistant polymer fibers as a matrix fiber.

16. A non-aqueous battery comprising a separator comprising:

a low melting-point polymer fiber layer (A) comprising a low melting-point polymer having a melting point of 100 to 200° C., the low melting-point polymer fiber layer (A) comprising nanofibers having a fiber diameter of 1000 nm or smaller and formed from the low melting-point polymer; and a heat-resistant polymer fiber layer (B) positioned on the low melting-point polymer fiber layer (A) and comprising a heat-resistant polymer selected from the group consisting of a high melting-point polymer having a melting point over 200° C. and a heat infusible polymer, the heat-resistant polymer fiber layer (B) comprising a mixture of nanofibers having a fiber diameter of 1000 nm or smaller and non-nanofibers having a fiber diameter over 1000 nm and both formed from the heat-resistant polymer.

* * * * *